Dec. 15, 1970   D. S. MILLER ET AL   3,548,347
FILTER UNIT HAVING MONOLITHIC CAPACITOR
Filed Feb. 16, 1968

United States Patent Office 3,548,347
Patented Dec. 15, 1970

3,548,347
FILTER UNIT HAVING MONOLITHIC CAPACITOR
David S. Miller, Dalton, and Harvey E. Goodell, Williamstown, Mass., assignors to Sprague Electric Company, North Adams, Mass., a corporation of Massachusetts
Filed Feb. 16, 1968, Ser. No. 706,081
Int. Cl. H03h 7/04
U.S. Cl. 333—79
4 Claims

ABSTRACT OF THE DISCLOSURE

An inductor and a feed-thru capacitor having at least one monolithic capacitor chip disposed within a conductive cup is mounted within a tubular housing with the cup connected in an uninterrupted band to the housing, and the inductor and a central member of the capacitor in connection to terminals of the housing.

BACKGROUND OF THE INVENTION

This invention relates to filter units and more particularly to a miniaturized filter unit which employs a monolithic feed-thru capacitor.

Increased sophistication and miniaturization of electronic cricuitry has placed ever tightening restrictions on filter units. Consequently, small, lightweight units having high performance are a necessity. Moreover, modern low voltage circuity also requires exceptionally low terminal to terminal resistance.

One object of this invention is to provide a compact highly efficient filter unit.

Another object is to provide a miniaturized hermetically sealed filter unit having low terminal resistance.

A further object of this invention is to provide a filter unit employing an encased monolithic feed-thru capacitor.

These and other objects of this invention will be apparent from the following description and claims taken in conjunction with the drawing.

SUMMARY OF THE INVENTION

Broadly, a filter unit provided in accordance with the invention comprises a feed-thru capacitor and an inductor disposed within a conductive tubular housing which is closed at both ends by terminal bearing seals, said capacitor having one or more monolithic capacitor chips disposed around a central conductive member and within a conductive cup-shaped sleeve which has an orifice in the bottom thereof, said chip having a plurality of electrodes disposed in spaced parallel relation within a dielectric material with every other electrode in connection to the periphery of said central member and intervening electrodes in peripheral connection to the inner circumference of said sleeve, said capacitor disposed within said housing with its sleeve in uninterrupted peripheral connection to the inner circumference of said housing, said central member being in electrical communication with one terminal and one end of said inductor, and the other end of said inductor being in electrical communication with said other terminal.

In a preferred embodiment, the central member is a tubular sleeve. A lead of the inductor extends through the sleeve to connect to one terminal of the housing, and the lead is uninterruptedly connected to the inner circumference of the sleeve.

A variety of filter units are provided by combining one or more encased capacitors and one or more inductors in a stacked arrangement within a tubular housing. In each case, the capacitor cup is noninductively connected at its periphery to the inner wall of the housing, and the capacitors and inductors are interconnected to provide low terminal to terminal D.C. resistance by passing the inductor lead through the central sleeve of the adjacent capacitor.

DESCRIPTION OF THE PREFERRED EMBODIMENTS

Figure 2:
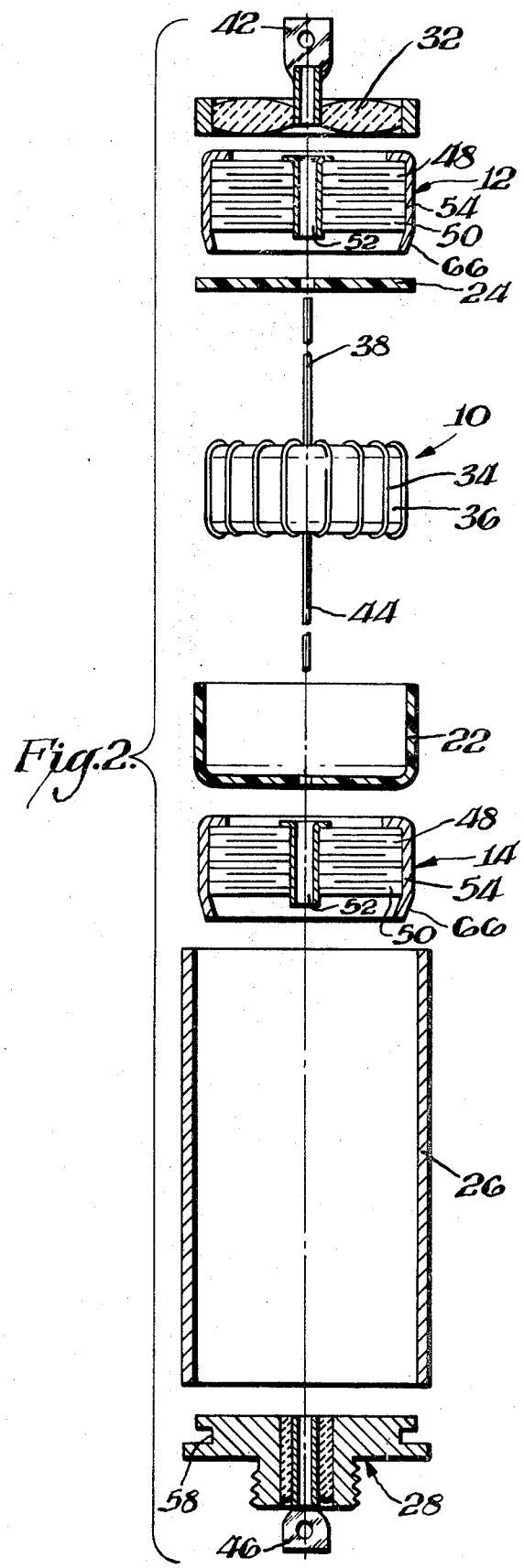
FIG. 2 is an exploded view partly in section of the filter unit of FIG. 1.
Figure 1:
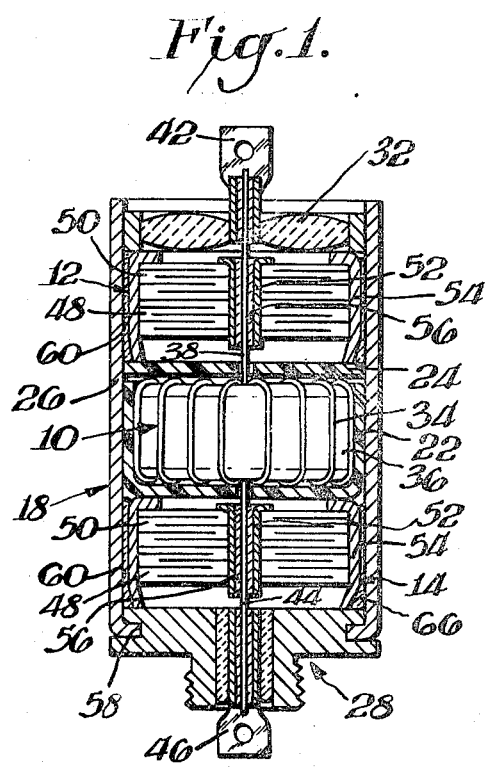
FIG. 1 is a view partly in section of a filter unit provided in accordance with the invention.

As illustrated in FIGS. 1 and 2, the filter unit of this embodiment includes a toroidal inductor 10 and a pair of feed-thru capacitors 12 and 14 sealed within a housing 18. Inductor 10 is stacked between capacitors 12 and 14 and is protected from them and from housing 18 by insulative cup 22 and insulative washer 24. Housing 18 is an assembled container which is made up of a cylindrical sleeve 26 of conductive material, closed at the bottom end by a threaded stud assembly 28 and at the upper end by a compression type glass-to-metal seal 32.

Inductor 10 is composed of a plurality of turns of conductor 34 of enamel coated copper wire, for example, approximately sized to carry the desired current. Wire 34 is wound around a toroidal core 36, such as ferrite or the like, with one end 38 connected to capacitor 12 and extended through it to terminal 42. Similarly, the other end 44 is connected to capacitor 14 and extended through it to terminal 46.

Capacitors 12, 14 utilize one or more monolithic chips disposed around a central conductive member 52 and within an open bottom cup 54. In this embodiment, each capacitor includes two chips 48 and 50 which are stacked within cup-shaped sleeve 54 with central member 52 extended through them. Preferably, member 52 is a tubular sleeve or eyelet having a passageway therethrough.

Chips 48 and 50 are conventional monolithic feed-thru chips in which a plurality of plane parallel electrodes of silver or the like (shown diagramatically) are integrally disposed within a ceramic dielectric such as barium titanate or the like, with alternate electrodes extended to the inner and outer diameters of the chip, respectively. Each chip is constructed in a conventional manner such as by building up a plurality of thin coatings such as by spraying or the like. Then the chips are cut on the inner and outer diameter to bring them to size and to expose the electrode material. Thereafter, the inner and outer edges are completely coated with a conductive material such as a silver paint or the like and then uninterruptedly soldered to eyelet 52 and cup 54 respectively, by a silver bearing solder or the like.

Brass or the like is suitable for eyelet 52, however, cup 54 should be of material whose coefficient of expansion is close to that of the ceramic, for example soft ingot iron or the like, so as to avoid stress of the capacitor chip and its connection to cup 54.

Although inductor wire 34 is insulatively coated, further protection is desirable. Preferably, inductor 10 is enclosed within cup 22 and washer 24, which are of high temperature insulative material such as polytetrafluoroethylene or the like, with leads 38 and 44 extended through insulators.

The filter unit is assembled by passing the toroid leads 38, 44 through the eyelet of the adjacent capacitor. The leads are cleaned and then soldered to each eyelet, respectively, as shown at 56. The connection between lead and eyelet is made non-inductive by filling the eyelet with solder. This provides a closed or uninterrupted ring of solder extending from the periphery of the lead to at least a narrow band of the inner diameter of eyelet 52 and provides an uninterrupted radial connection between the lead and its coaxial eyelet. Preferably, the lead is also connected throughout the length of the eyelet so as to reduce the lead length and inductance of the capacitor.

Housing 18 is mechanically assembled by crimping one end of tube 26 within a recess 58 of stud assembly 28. This mechanically secures the sleeve to the stud assembly and forms an open ended container 18. The inductor-capacitor assembly is then inserted within housing 18 with lead 44 extended through hollow terminal 46 and with a preform or solder ring (for example, a ring of .025 inch wire diameter) of low melting temperature tin-lead solder or the like included on the top of each capacitor near its outer edge. A solder ring is also positioned on stud assembly 28.

The structure is then heated to solder the periphery of cup 54 to the inner diameter of cylinder 26 as shown at 60. This connection is also made noninductive by providing a complete uninterrupted solder connection, or band, between the cup and the inner wall of the housing. The noninductive characteristics are further enhanced by also forming as complete a connection as possible throughout the length of the cup so as to further minimize capacitor lead length. In this regard, the outer diameter of cup 54 is made a good solder fit to cylinder 26; for example, .001 inch to .005 inch smaller than the inner diameter of cylinder 26. Additionally, solder flows into recess 58 so as to hemetically seal cylinder 26 to stud assembly 28.

Advantageously, the cup construction allows a more controlled fit to the cylinder or outer container and enhances its noninductive soldering. Additionally, the use of an outer cup to encase the capacitor chips also provides a wider latitude in choice of housing materials. That is, the cup relieves the housing sleeve of the restriction that its coefficient of expansion be matched to that of the chip and allows use of casing materials without concern for amalgamation of the silver utilized for connection between the chip and cup.

It should be noted that capacitors 12 and 14 are mounted within housing 18 with the bottom of the capacitor cup facing the top or open end of housing 18. This arrangement, provides more room for insertion of a solder ring at the corner of the cup, allows the solder to flow downward during the soldering step and enhances the formation of a good uninterrupted solder fillet at the cup corner.

In the next step, a glass-to-metal seal 32 is sealed at its periphery to the open end of housing 18 with lead 38 extended through terminal 42. The unit is then completed by soldering leads 38 and 44 to their respective terminals which also seals both terminals.

Figure 3:
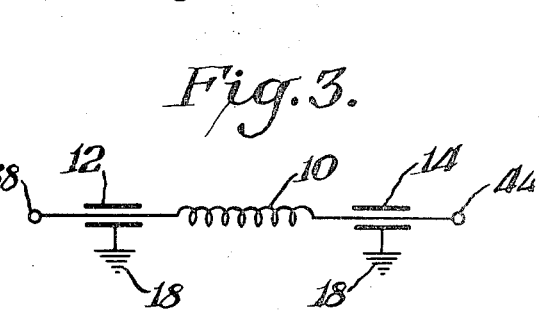
FIG. 3 is a schematic diagram illustrating the electrical equivalence of the filter of FIG. 1.

This construction provides a π-type filter whose electrical circuit is shown in FIG. 3 wherein inductor 10 and capacitors 12, 14 are identified to more clearly show the equivalence.

Low terminal to terminal resistance is provided in this construction since an unbroken conductor, that is wire 34, extends from terminal 42 to terminal 46 and alleviates the possibility of resistive connections in the current path between terminals. Additionally, the noninductive capacitor construction provides exceptionally low RF impedance from terminal to case, and the uninterrupted solder joints provide excellent RF shielding.

Figure 4:
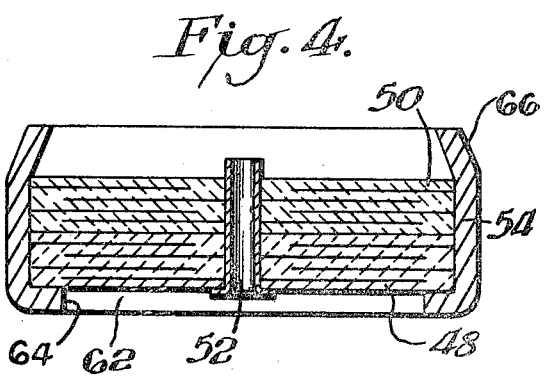
FIG. 4 is a view in section of an encased feed-thru capacitor employed in the filter unit of this invention.

The chip construction is illustrated more clearly in FIG. 4 wherein two monolithic chips 48 and 50 are seated within cup 54 with eyelet 52 extended through the center of both chips. Cup 54 includes an orifice 62 in its bottom surface which is surrounded by a ledge 64 formed by the turned in cup edge. Where a plurality of chips are used, as in this embodiment, the chips are mechanically secured before soldering by turning in the upper edge of the cup as shown at 66. This straps the discs until they are soldered in place.

The inner and outer diameter of the chips, which are coated with silver or the like, are soldered to eyelet 52 and cup 54 with silver bearing solder such as a silver bearing lead/indium alloy or the like. As indicated, as complete a solder connection as possible is provided between the chip edges and the adjoining conductive members to insure uninterrupted connection of the electrodes to these members.

Many modifications are possible. For example, one to several chips may be employed. Additionally, the eyelet may be a simple tube or even a solid rod. In the latter case, however, the inductor lead would not pass through the control member but would preferably be connected to its adjacent end while its other end is connected to the terminal. Hence, the latter construction may provide higher terminal to terminal DC resistance due to the interconnections.

Other circuit configurations are also possible. For example, one capacitor and inductor can be utilized, or a pair of inductors with a capacitor stacked between them may be employed in a T-type filter circuit. In each case, the elements are connected to provide an electrical path in series through the one or more inductors and the central members of the capacitors. Preferably, the inductor lead extends through the center member and is connected throughout the length of the central member as well as in an uninterrupted radial bond within the member. For example, in the T arrangement, one lead of each inductor is joined in common within the central member of the interposed capacitor and the other lead of each is in connection to its adjacent terminal.

Thus many different modifications and changes are possible without departing from the spirit and scope of the invention described herein and it should be understood that the invention is not to be limited except as set forth in the appended claims.

What is claimed is:

1. A filter unit comprising: at least one feed-thru capacitor and at least one inductor disposed within a tubular conductive housing which is closed at each end by a terminal bearing glass-to-metal seal; each of said seals having a tubular metal terminal disposed within a glass member, one of said seals being disposed within a metal stud assembly, said housing being a metal cylinder having one end mechanically secured to and in uninterrupted connection to the perimeter of said stud assembly and the other end in uninterrupted connection to the outer perimeter of the other glass-to-metal seal, said capacitor having one or more monolithic capacitor chips disposed within a conductive cup-shaped sleeve with a centrally located tubular member of conductive material extended extended through said chip; said chip having a plurality of electrodes disposed in spaced parallel relation within a dielectric material, said chip having the inner diameter of every other electrode in uninterrupted peripheral connection to said central conductive member and intervening electrodes in uninterrupted peripheral connection to the inner circumference of said sleeve; said capacitor being disposed within said housing with said sleeve in uninterrupted peripheral connection to the inner circumference of said housing; said inductor being a toroidal inductor having a plurality of turns of conductive wire wound on a toroidal core, one end of said wire extended through said central member to within one of said terminals, said one end of said wire being in uninterrupted peripheral connection to said central member and said one terminal; and the other end of said wire extended within the other terminal in uninterrupted peripheral connection thereto so as to provide an electrical path from said one terminal through said central member and said inductor to said other terminal, 2. The filter of claim 1 wherein said inductor core is a ferrite core.

3. The filter of claim 1 including a plurality of capacitor chips stacked in an overlying relation within said cup-shaped sleeve with said central member extending through said plurality, and the open end of said cup is turned inwardly to mechanically trap said capacitor chips therein.

4. The filter of claim 1 including a pair of said capacitors with said inductor interposed therebetween, said wire of said inductor being extended through the central member of each capacitor and is in connection to the terminal adjacent thereto, and said wire being in uninterrupted peripheral connection to the central members through which it extends.

References Cited

UNITED STATES PATENTS

| | | | |
|---|---|---|---|
| 2,430,433 | 11/1947 | Minnium | 317—261 |
| 2,491,681 | 12/1949 | Minter | 333—79 |
| 2,898,523 | 8/1959 | Charles | 333—79X |
| 3,060,392 | 10/1962 | Ciancarelli | 333—79 |
| 3,137,808 | 6/1964 | Coda et al. | 317—261X |
| 3,163,834 | 12/1964 | Malmstrom | 333—79 |
| 3,398,326 | 8/1968 | Swart et al. | 317—256X |

ELI LIEBMAN, Primary Examiner

W. H. PUNTER, Assistant Examiner

U.S. Cl. X.R.

317—256, 261; 333—705